United States Patent [19]

Morin

[11] 4,165,732

[45] Aug. 28, 1979

[54] PROCESS AND APPARATUS FOR OBTAINING HOT WATER BY USE OF SOLAR ENERGY

[75] Inventor: Claude Morin, St. Lattier, France

[73] Assignee: Pechiney Ugine Kuhlmann, Paris, France

[21] Appl. No.: 732,188

[22] Filed: Oct. 13, 1976

[30] Foreign Application Priority Data

Nov. 18, 1975 [FR] France .................. 75 35749

[51] Int. Cl.² .............................................. F24J 3/02
[52] U.S. Cl. .................... 126/419; 237/1 A; 219/314; 126/437
[58] Field of Search .................. 126/270, 271, 400; 237/1 A, 8 R, 8 A, 8 C, 63, 59; 219/312, 314, 327

[56] References Cited

U.S. PATENT DOCUMENTS

| | | | |
|---|---|---|---|
| 1,888,620 | 11/1932 | Clark | 126/271 X |
| 3,262,493 | 7/1966 | Hervey | 126/271 X |
| 3,620,450 | 11/1971 | Leuenberger | 237/8 |
| 3,821,516 | 6/1974 | Hayes et al. | 219/327 X |
| 3,974,427 | 8/1976 | Carson | 237/8 R |
| 3,974,822 | 8/1976 | Patil | 126/271 |
| 3,977,601 | 8/1976 | Bearzi | 237/8 R X |
| 3,980,071 | 9/1976 | Barber, Jr. | 126/271 |
| 3,998,207 | 12/1976 | Watt | 126/271 |
| 4,015,586 | 4/1977 | Vroom et al. | 237/1 A X |

Primary Examiner—Albert W. Davis, Jr.
Assistant Examiner—Larry Jones
Attorney, Agent, or Firm—Dennison, Dennison, Meserole & Pollack

[57] ABSTRACT

A process and an apparatus for preparation of hot water, using solar energy is set forth. In the process, the water is made to circulate successively in two reservoirs connected in series, and the water is heated from solar energy in one reservoir while the second reservoir can be heated by a known means, such as an electrical resistance. Continuous circulation of the water is created, in a closed loop, by a circulator pump which introduces at least a part of the water discharging from the second reservoir into the first reservoir.

16 Claims, 4 Drawing Figures

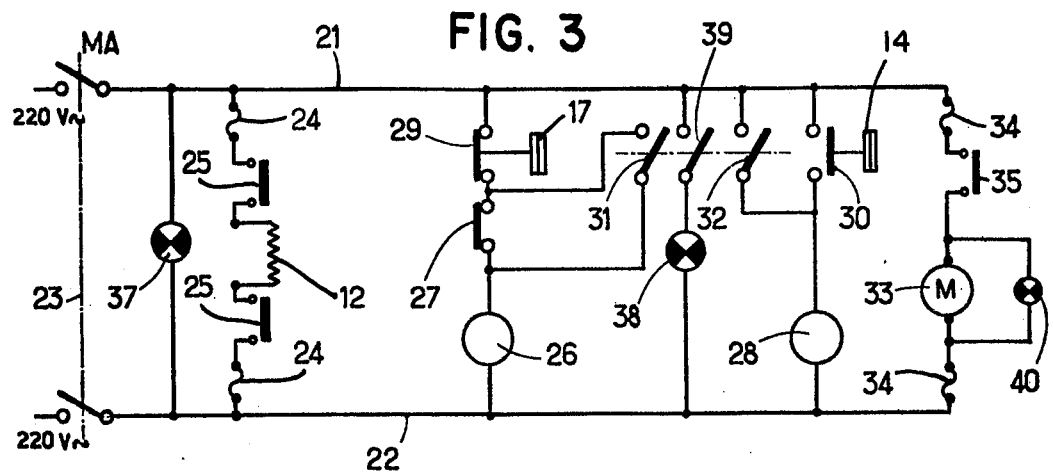

4,165,732

PROCESS AND APPARATUS FOR OBTAINING HOT WATER BY USE OF SOLAR ENERGY

The present invention concerns a process and apparatus for obtaining hot water from solar energy.

Solar flux is irregular and intermittent throughout any day as well as throughout any year. This necessitates storage of the collected energy and a contribution of auxiliary electrical energy as needed. The electrical installation must be computed from the total needs of the user, even if these needs must be met only during a few days of the year.

It is known to prepare hot water from solar energy by using a single storage reservoir, including, at the top, an electric heating resistance and, at the bottom, an exchanger with a heat-carrying fluid heated in a solar collector. The cold water enters into the reservoir from the bottom, and the hot water is drawn out in the top part.

As a result of the stratification due to the difference of density between the hot and cold water, the exchanger plays the role of a preheater as opposed to the electrical resistance. In fact, during certain times of the year, the exchanger can hardly heat all of the water in the reservoir. At those times, recourse to electric energy must always be available, or a great volume of cold water will be withdrawn before the arrival of hot water, if the withdrawal is from the bottom part of the reservoir.

This problem can be remedied by creating a constant circulation from the bottom upward, with a circulator which is a small low pressure pump. A closed loop of hot water is thus formed, which, in addition to providing advantages to the user, also allows equalization of the water temperature in the entire reservoir. Thus, water can be heated either by the exchanger, when the sun is high, or by the electric resistance, when the sun is very low, or even by a combination of the two sources when the sun is average.

But this device presents the inconvenience of placing the exchanger in an area where the water is very hot, with low utilization of the solar energy. Besides, the loop of hot water causes great thermal losses.

A device is also known which comprises two separated reservoirs, set in series. The first reservoir has the exchanger connected to solar collectors at the bottom; the second has the electric heating resistance. The cold water enters at the bottom of the first reservoir, passes through the top part of this reservoir to the bottom part of the second reservoir, from where it rises through the top part to be used.

This system simplifies the regulation problems, but it has major inconveniences.

If the volume of the second reservoir is sufficient for the needs of the user, it is constantly heated, and because of that the first reservoir serves only as preheater during extraction; besides, the cost is great for two reservoirs of great volume.

If the two reservoirs are smaller, their volume being on the order of half of what it was in the preceding case, and the second reservoir is still constantly heated by its electrical resistance, there is no arrangement, when the sun is low or there is none, for a movement of hot water equal to the volume of the second reservoir. When the sun is great, it serves only for heating a small volume of water, that of the first reservoir, of which the temperature increases until the heat losses equalize the heat received from the solar collectors, while the second reservoir continues to be heated by means of electrical energy.

This device, which is currently being used, does not permit optimal use of the solar energy.

The object of the invention is a process for preparation of hot water from solar energy in a manner designed to overcome these inconveniences.

An apparatus for carrying out this process constitutes another object of the invention.

In the process, the water is made to circulate successively in two reservoirs connected in series, and this water is heated from the solar energy in the first reservoir, which contains cold water, and the second reservoir is susceptible to being heated from a known means, such as an electrical resistance. A continuous circulation of the water is created, in closed loop, by introducing at least a portion of the water coming out of the second reservoir into the first reservoir.

The apparatus of the invention includes a first reservoir with a cold water inlet tubing at the bottom, and water discharge piping at the top, and also includes a heat exchanger such as a tubular bundle, connected to at least one solar collector, and a second reservoir connected, at the bottom, to the piping coming from the first reservoir, and provided with hot water discharge piping, this second reservoir including a heating means such as an electrical heating resistance. A circulator connects the discharge piping of the second reservoir to the first reservoir, so as to be able to create a water circulation in closed circuit in the two reservoirs.

The invention is explained relative to the examples shown in the attached drawings.

FIG. 3 is a schematic diagram of a control device for the apparatus of FIG. 2.

FIG. 4 is a diagram of a modified apparatus which offers a still better utilization of the solar energy and can also be controlled by the control device of FIG. 3.

On these drawings, the same elements are designated by the same reference characters.

Figure 1:
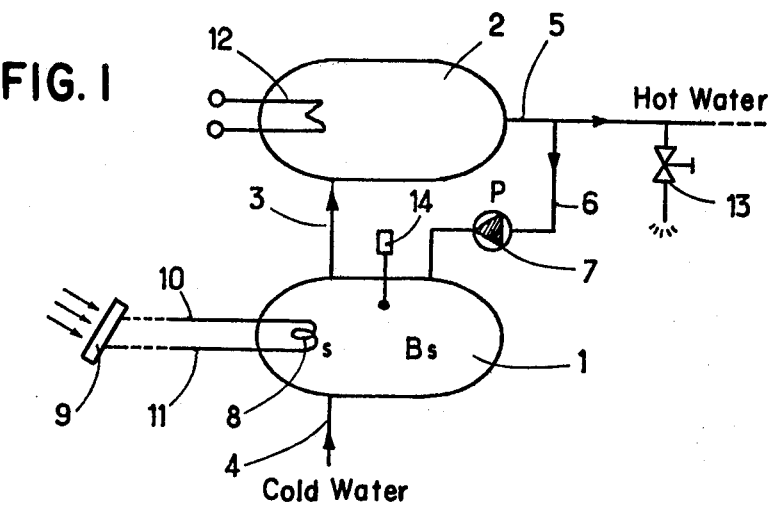
FIG. 1 is a schematic diagram of the plan of the apparatus.

The apparatus consists of two reservoirs 1 and 2, mounted in sequence with water piping 3 going from the top of reservoir 1 to the bottom of reservoir 2. Tubing 4, plugged into the bottom of reservoir 1, is for inlet of cold water, while a tubing 5 permits discharge of the hot water from reservoir 2. Piping 6, provided with a circulator 7, which is a low flow and low pressure pump, permits the circulation of the water in closed circuit, in some conditions. Reservoir 1 contains a heat exchanger 8, in the form of a bundle of tubes connected to one or more solar energy collectors 9 through piping 10 and 11 carrying a heat-carrying fluid such as water with a glycol additive. This is heated in collector 9 and, by circulating in exchanger 8, it heats the water of reservoir 1. This circulation of the heat-carrying fluid between 8 and 9 can be accomplished by natural thermosyphon action or else can be assured by a circulator, not shown. Reservoir 2 contains a heating means such as an electric resistance 12 to heat the water therein. A hot water cock 13 represents the point of utilization.

The flexibility of use of this device permits three modes of function, of which the best mode is chosen continuously according to the sun conditions and needs of the user:

in the case of strong sun, the electrical resistance 12 is unplugged; because of the closed circuit circulation, the water of the two reservoirs is heated by the bundle of tubes 8, in other words by solar energy;

in the case of average sun, the electrical resistance is plugged in but reservoir 1 serves as preheater, yielding an economy of electrical energy, and circulator 7 is then stopped;

in the case of low or no sun, the heat supplied to the bundle of tubes 8 is negligible, and only the electrical resistance assures heating of reservoir 2, as circulator 7 is stopped. However, a manual switch permits the user to cause the circulator to function, which then assures the disposition of a volume of hot water corresponding to the total volume of the two reservoirs 1 and 2.

It is advantageous to provide essentially the volume of the two reservoirs so that, even with a strong sun, the storage of solar energy is effected at as low a temperature as possible for the expected usage, which increases the yield of the collectors 9 and decreases the thermal losses from the whole installation.

A thermostat 14 permits the electrical resistance 12 and the circulator pump 7 to be brought under the control of the temperature t1 of the reservoir: in this manner, resistance 12 is connected only if the temperature t1 of reservoir 1 is insufficient and circulator 7 functions only when the collected solar energy is insufficient to heat the two reservoirs, or when, as an exception, the user needs a great quantity of hot water in spite of the poor atmospheric conditions, even at the price of greater electrical expenditure, as stated above.

Figure 2:
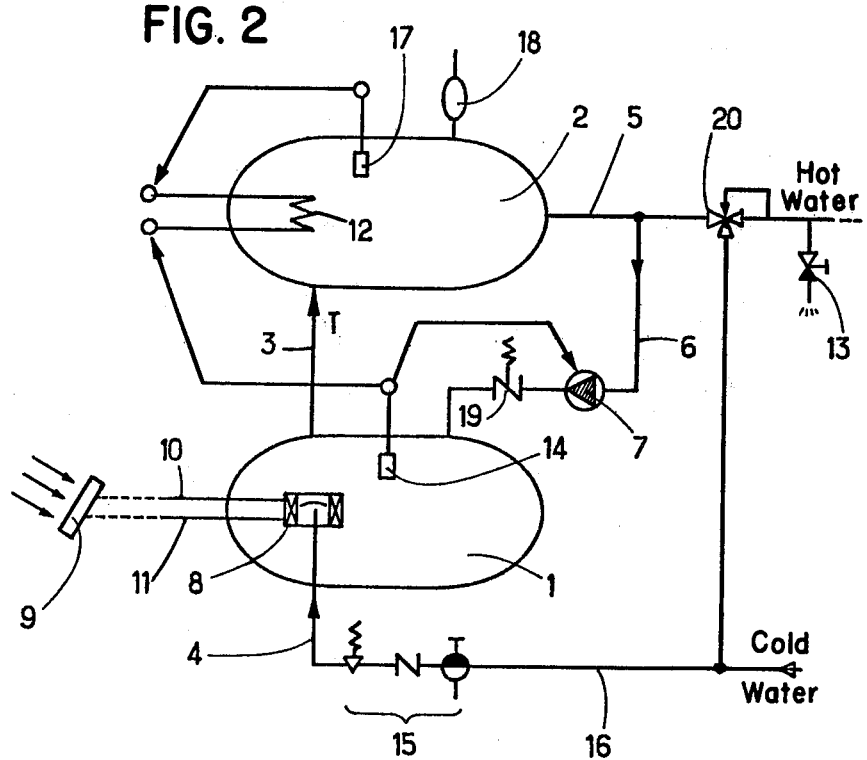
FIG. 2 is a somewhat more detailed schematic diagram of the apparatus according to the same principle.

FIGS. 2 and 3 illustrate a more detailed embodiment.

The same reservoirs 1 and 2 are here connected by the water piping 3, and also the piping 6 and the circulator 7, which permits closed circuit circulation.

Reservoir 1 is provided with a heat exchanger 8 which is connected to one or more solar energy collectors 9 through piping 10 and 11, and a heat-carrying fluid circulates in closed circuit in collectors 9, the piping and exchanger 8. Tubing 4 for input of cold water opens in the center of the exchanger, so that it covers it to a great extent with cold water. The cold water feed to this tubing 4 is effected through a series of safety adjustments, through pipe 16.

Reservoir 2 contains the electric resistance 12, under the control of two thermostats, of which one, 14, at the very top of reservoir 1, is opened when the temperature t1 of reservoir 1 exceeds its assigned value, and of which the other, 17, at the very top of reservoir 2, is opened when the temperature t2 of reservoir 2 exceeds its assigned value. Reservoir 2 is also provided with a degasification and purge bottle 18.

A spring valve 19 is connected with the circulator 7, prohibiting excitation of a natural thermosyphon between the two reservoirs when the circulator is stopped. The apparatus is completed by a mixing valve 20 which, by mixture of cold and hot water coming from reservoir 2, allows discharge of water at the desired temperature through cock 13. The mixing valve is controlled by the temperature of the water being discharged from reservoir 2. It constitutes a safety in case the solar energy would heat the two reservoirs to a temperature which would be dangerous to the user.

This apparatus is controlled by an electric control device, as shown in FIG. 3, fed through the field under 220 volts.

All of the circuits are connected between two poles 21 and 22, connected to the field by means of a double switch 23.

The electrical resistance 12 is connected between these two poles, placed symmetrically and in series between two fuses 24 and two contacts 25 which are opened when an electric relay with winding 26 is at rest. It is obvious that one of these fuses and one of these contacts can be omitted. Between the two poles 21 and 22, there is a second circuit comprising, in series, the winding 26, a first contact 27, which is closed when the relay with winding 28 is at rest, and the contact 29 of the thermostat 17 of reservoir 2, which is opened when the temperature exceeds its assigned value. A third circuit between poles 21 and 22 comprises the contact 30 of thermostat 14 of reservoir 1, in series, which is closed when the temperature of the latter exceeds its assigned value, and winding 28. Between the second and the third circuit is mounted a "manual" switch, including two contacts, with contact 31 placed in parallel on contact 27, and contact 32 in parallel on contact 30: these contacts 31 and 32 are opened or closed at the same time. Finally, a fourth circuit is also set in parallel on poles 21 and 22, and includes the motor 33 of circulator 7, set in series with two protection fuses 34 and with a second contact 35 open when the relay of winding 28 is at rest. Signals can be provided for control at any moment of the operation of the device, for example the signal 37, parallel on 21-22, which controls the general current feed, the signal 38, controlled by a third contact 39 of the "manual" switch, which controls the position of the latter, and the signal 40, parallel in motor 33, which indicates the beginning of function of circulator 7.

The function of this apparatus is explained as follows:

In average or low sun, the temperature t1 of reservoir 1 is lower than its assigned value; the contact of thermostat 14 is open, so that winding 28 is not excited. Contact 27 is thus closed, and contact 29 of thermostat 17 plays its customary role as in any electric heating reservoir. At the same time, contact 35 remains open, thus the circulator remains at rest: reservoir 2, and it alone, is heated electrically. Reservoir 1 comes into play only as preheater of the cold water. Mixing valve 20 furnishes this water at the temperature of utilization by mixing cold water and hot water first removed from reservoir 2 at the temperature imposed by thermostat 17, and reservoir 1 comes into play only as preheater of cold water which enters to compensate for the volume removed from 2.

In strong sun, the temperature of reservoir 1 exceeds its assigned value, so that contact 30 is closed. Winding 28 is under tension, causing contact 27 to open and contact 35 to close. Opening of contact 27 prohibits winding 26 from being put under tension, and consequently, also resistance 12. Closing of contact 35 causes motor 33 to be put under tension, so that circulator 7 is started. Thus, there is circulation of water between the two reservoirs 1 and 2, which are both heated from solar energy. In the case where the solar energy is sufficient to raise the temperature beyond the desired value for the temperature of reservoir 2, it is possible to store a supplementary quantity of heat; when it is withdrawn, mixing valve 20 intervenes and causes a mixing with cold water.

In case of low sun and exceptionally great need for hot water, the manual switch 31-32 is actuated: winding 28 is under tension, which starts motor 33 and causes feed of the resistance 12: thus the two reservoirs 1 and 2 are electrically heated, and thus a volume of hot water equal to the total stored water is discharged.

It is possible to double the "manual" switch 31-32 with a programmed contact, not shown on FIG. 3, for example a daily or weekly clock.

One can note that it is easy to make a traditional electric water heater complete, whether instantaneous or accumulation type, by a solar reservoir 1 as in FIG. 1; only slight electrical modifications are necessary.

Preferably, the desired temperatures for reservoirs 1 and 2 are equal. To modify the temperature of the hot water, the thermostat 14 is kept constant and 17 is an adjustable thermostat.

It is also possible to use an adjustable thermostat 17, and to replace thermostat 14 by a differential thermostat 14', as shown in FIG. 4. In this case, the essential elements of thermostat 14' are placed respectively in reservoir 1 and in reservoir 2 so as to actuate the circulator 7 when the difference between the temperatures of the two reservoirs is equal or below the desired value.

The described device has a slight inconvenience relative to the function in average sun, i.e., when the desired temperature of reservoir 1 can not be attained. In this case, the solar calories serve only to preheat the volume of water necessary for compensation of the volume withdrawn from reservoir 2. This is not optimum use, especially if the water is withdrawn at different periods of time.

This situation is improved by using the variation shown in FIG. 4. This apparatus differs from the preceding only by the presence of a second mixing valve 41, connected to the discharge from reservoir 2 for its first input, by means of a check valve 42, and for its second input, to the discharge from reservoir 1, and for its discharge, to the input into the existing mixing valve 20, already connected to the discharge from reservoir 2. This mixing valve 41 is controlled by the temperature of the discharging water. The installation of regulation as in FIG. 3 is also contemplated.

This apparatus allows first removal of the water from solar reservoir 1, whatever be its temperature, and this occurs at each withdrawal. Mixing valve 41 is adjusted to a temperature lower than the desired temperature of reservoirs 1 and 2, for example 45° C. for the mixing valve to 50° C. for the reservoir.

This first removal is particularly advantageous both for the economy of electrical energy consumption which is realized and for the maximum quantity of warm water which can be withdrawn at one time. An example drawn from the testing shows this.

The installation for the test includes two reservoirs 1 and 2, each with a 150 liter capacity. In the three examples described below, the electric reservoir is heated to 50° C., and its heating stopped during the test. That corresponds to the fact that, during normal withdrawal of water, the contributed electric power can be considered as negligible. It is actually nonexistent in the case of a nighttime heating electric storage reservoir.

It must also be mentioned, for comprehension of the tests, that during rapid withdrawal there is practically no mixing in the reservoir between the hot water remaining and the cold compensation water. That is because of the piston effect, which is well known, and which permits withdrawal of up to 90% of the volume of the reservoir at a practically constant temperature.

EXAMPLE 1

Only the electrically heated reservoir is in service, at 50° C. That corresponds to a traditional installation, without solar heating.

The first test consists of withdrawing 20 liters of water at 40° C. first, this water being prepared in the mixing valve 20 by mixing water at 50° C. and cold water, which is at 15° C.

Then the quantity of electrical energy necessary to furnish reservoir 2 so that its mean temperature returns to 50° C. is measured.

In my case, this electrical outlay was measured as equal to 0.582 KW.h, i.e., 0.0291 KW.h per liter of water used at 40° C.

With the same installation, the second test consists of effecting a prolonged withdrawal, at a flow rate equal to 400 liters/hour, which corresponds to a current faucet, and is such that the piston effect is produced in reservoir 2. The total flow which can thus be withdrawn at 40° C. at the discharge of mixing valve 20 is measured.

In these conditions, the maximum withdrawal at 40° C. was measured as equal to 190 liters, the water temperature withdrawn then very rapidly approaching 15° C.

EXAMPLE 2

The two reservoirs are set as in FIG. 2, and reservoir 1 is placed at 35° C. The other test conditions are the same as in the first case. Circulator 7 is normally stopped.

First test: After withdrawal of 20 liters of water at 40° C., the electrical consumption to return reservoir 2 to 50° C. was raised to 0.25 kW.h, i.e., 0.0125 kW.h per liter of water used.

Second test: The maximum of water withdrawable at 40° C. was, in this case, equal to 190/liters, i.e., as much as in the first example, which is easily understood.

EXAMPLE 3

The two reservoirs are set as in FIG. 4. Reservoir 1 is at 35° C. Circulator 7 is stopped. The other test conditions are those of the preceding tests. The water at 40° C. is obtained by action of mixing valve 41.

First test: After withdrawal of 20 liters of water at 40° C., the electrical consumption necessary to return reservoir 2° to 50° C. was equal to 0.117 kW.h, i.e., 0.00585 kW.h per liter of hot water used.

Second test: The maximum quantity of water which can be withdrawn at 40° C. was, in this case, equal to 262 liters, which is considerable.

The table below shows the rest of these tests, and thus shows the importance of solar heating in general, and particularly the advantage of a circuit as in FIG. 4 relative to a more traditional circuit.

|  | Electric consumption in kW.h per liter of water used. | Maximum withdrawal of water at 40° C., in liters. |
| --- | --- | --- |
| "Total electric" circuit | 29.1 | 190 |
| Circuit as in FIG. 2 | 12.5 | 190 |
| Circuit as in FIG. 4 | 5.85 | 262 |

(Values corresponding to the above test conditions.)

Other tests, too long to be described here, but according to the same general principles, have consisted of effecting the withdrawals at sufficiently slow flows so that the "piston effect" is not produced in reservoirs 1 and 2. On the contrary, an almost isothermic mixing of the water had time to occur during the withdrawals. In these conditions, the comparison between the three circuits gave results of the same ratio as those shown above. Thus, I believe that these two series completely include all of the conditions of withdrawal which can be met in an actual installation for sanitary hot water.

The invention applies to the preparation of hot water from solar energy, this hot water being available for all usages, such as: heating of buildings, sanitary heating, and industrial heating.

I claim:

1. A process for heating water through the use of solar energy, comprising the steps of:
   supplying relatively cold water into a bottom portion of a first reservoir;
   heating the relatively cold water by solar energy in a portion of the first reservoir other than a top portion;
   ducting the heated water from the top of the first reservoir to a lower portion of a second reservoir;
   further heating the heated water by non-solar energy in the second reservoir; and,
   ducting at least a portion of the further heated water to the top of the first reservoir, thereby creating a circulation of water in a closed loop between said reservoirs to cause the temperature of water in both of said reservoirs to attain a desired level.

2. The process of claim 1 wherein the heated water in the second reservoir is further heated to a temperature higher than the temperature of the heated water entering the second reservoir.

3. The process of claim 1 wherein the step of further heating the heated water in the second reservoir is accomplished through the use of electrical energy.

4. The process of claim 1 and further comprising the steps of:
   mixing at least a portion of the further heated water ducted from the second reservoir with water extracted from an upper portion of the first reservoir; and,
   ducting the mixed water to a point of use.

5. The process of claim 1 and further comprising the step of ducting a remaining portion of the further heated water from the second reservoir to a point of use.

6. Apparatus for heating water through the use of solar energy, comprising:
   a first reservoir;
   cold water inlet means for introducing relatively cold water into a bottom portion of the first reservoir;
   means for collecting solar energy;
   a heat exchanger disposed within a portion of the first reservoir other than the top portion in heat exchanging contact with water contained therein;
   means connecting the solar energy collecting means with the heat exchanger to deliver solar-derived energy from the solar energy collecting means to the heat exchanger, water contained within the first reservoir being heated by heat exchange with the heat exchanger;
   a second reservoir;
   piping means connecting an upper portion of the first reservoir to a bottom portion of the second reservoir for introducing heated water from the first reservoir into the second reservoir;
   means disposed within the second reservoir for further heating the heated water introduced into the second reservoir;
   outlet conduit means for discharging the further heated water from the second reservoir; and,
   recirculation means disposed between and communicating with the outlet conduit means and an upper portion of the first reservoir for carrying a portion of the further heated water to the first reservoir, thereby creating a closed circuit water circulation between the first and second reservoirs.

7. The apparatus of claim 6 wherein the further heating means comprises electrically operable heating means.

8. The apparatus of claim 6 and further comprising means communicating with the outlet conduit means for carrying the remaining portion of the further heated water from the outlet conduit means to a point of use.

9. The apparatus of claim 6 wherein the recirculation means comprise:
   pump means for circulating water through the recirculation means; and,
   thermostatic means disposed in the first reservoir and being operably connected to the pump means for actuating said pump means on attainment of a given temperature within the first reservoir.

10. The apparatus of claim 9 wherein the thermostatic means comprises contact means operably connected to the further heating means for discontinuing the supply of energy to the further heating means on actuation of the pump means.

11. The apparatus of claim 9 wherein the pump means comprise an electrically-driven motor and wherein the further heating means comprise electrical heating means, the apparatus further comprising means for automatically controlling the apparatus, said automatic control means comprising a pair of terminal poles, a first relay having a winding connected between said poles, said motor being in series with a first contact of said first relay, said winding being in series with a contact member which is actuated by said thermostatic means, a second relay having a winding in series with a second contact of said first relay and a contact member of a second thermostatic means, said second thermostatic means being located in said second reservoir, and said electrical heating means being in series with a contact member actuated by said second relay winding.

12. The apparatus of claim 6 wherein the recirculation means comprise:
   pump means for circulating water through the recirculation means; and,
   differential thermostatic means having thermostatic elements in each of the reservoirs and being operably connected to the pump means for actuating said pump means when the difference in temperature within the two reservoirs is equal to or lower than a given value.

13. The apparatus of claim 12 wherein the differential thermostatic means comprises contact means operably connected to the further heating means for discontinuing the supply of energy to the further heating means on actuation of the pump means.

14. Apparatus as set forth in claim 13 and further including manual switch means connected to said electrical heating means to permit heating of water when an exceptional need for hot water exists during periods of little sunlight.

15. The apparatus of claim 6 and further comprising means for selectively causing water flow within the closed circuit created by the recirculation means.

16. The apparatus of claim 15 and further comprising:
outlet means connected respectively to and communicating with the second reservoir and an upper portion of the first reservoir;
means communicating with the outlet means for mixing at least a portion of the water carried by said outlet means; and,
means communicating with the mixing means for ducting water mixed by said mixing means to a point of use.

* * * * *